United States Patent [19]

Midorikawa et al.

[11] 4,275,962
[45] Jun. 30, 1981

[54] PROJECTION DEVICE

[75] Inventors: Koyo Midorikawa, Tokyo; Atsuo Tsunoda, Fuchu; Hidetoshi Murase; Noritaka Mochizuki, both of Yokohama; Setsuo Minami, Kawasaki; Yoshiya Matsui, Yokohama; Masazumi Moriwaki, Tokyo; Mikio Suzuta, Yokohama, all of Japan

[73] Assignee: Canon Kabushiki Kaisha, Tokyo, Japan

[21] Appl. No.: 105,789

[22] Filed: Dec. 20, 1979

[30] Foreign Application Priority Data

| Dec. 28, 1978 [JP] | Japan | 53-165885 |
| Dec. 28, 1978 [JP] | Japan | 53-165886 |
| Dec. 28, 1978 [JP] | Japan | 53-165887 |
| Dec. 28, 1978 [JP] | Japan | 53-165888 |
| Dec. 28, 1978 [JP] | Japan | 53-165889 |
| Dec. 28, 1978 [JP] | Japan | 53-165891 |
| Dec. 28, 1978 [JP] | Japan | 53-165893 |
| Dec. 28, 1978 [JP] | Japan | 53-165894 |
| Dec. 28, 1978 [JP] | Japan | 53-166049 |
| Dec. 28, 1978 [JP] | Japan | 53-166054 |
| Dec. 28, 1978 [JP] | Japan | 53-166055 |

[51] Int. Cl.³ .................................................. G03B 27/00
[52] U.S. Cl. .......................................... 355/1; 355/8; 355/50
[58] Field of Search ....................... 355/1, 50, 51, 52; 350/167, 254, 213, 272; 354/236

[56] References Cited

U.S. PATENT DOCUMENTS

| 3,584,952 | 6/1971 | Gundlach et al. | 355/52 |
| 3,592,542 | 7/1971 | Käufer et al. | 355/50 |
| 3,977,777 | 8/1976 | Tanaka et al. | 355/1 |
| 4,168,900 | 9/1979 | Adachi | 355/1 |

Primary Examiner—Richard A. Wintercorn
Attorney, Agent, or Firm—Fitzpatrick, Cella, Harper & Scinto

[57] ABSTRACT

This specification discloses a compact projection device in which lens systems extending in the direction of the optic axis for projecting a part area of an object upon a predetermined part area on an image plane (hereinafter referred to as element lens systems) are initially set by a lens holding member having groove portions or hole portions extending in the direction of the optic axis, the distributions of intensity of light of the element lens systems on the image plane are controlled by an aperture eclipse such that the intensity of light is weaker in the marginal area than at least in the central area, a plurality of such element lens systems are arranged in a predetermined direction in a plane perpendicular to the optic axis and the distributions of intensity of light of the element lens systems are suitably superposed upon one another at least in the marginal area to provide uniformity of the distribution of the exposure amount integrated in the scanning direction with respect to the lengthwise direction of the slit of a copying machine of the slit exposure type. The element lens system each comprises two bar lenses each having a great length in the direction of the optic axis thereof as compared with the effective diameter thereof, and an intermediate image is once formed between the bar lenses and finally, a one-to-one magnification image is provided. The element lens systems are arranged in more than two rows in a honeycomb-like fashion such that the element lens systems of each row are positioned intermediate the element lens systems of the other row as viewed in the direction of the optic axis, whereby the uniformity of the distribution of the exposure amount integrated in the scanning direction with respect to the lengthwise direction of the slit is improved.

13 Claims, 36 Drawing Figures

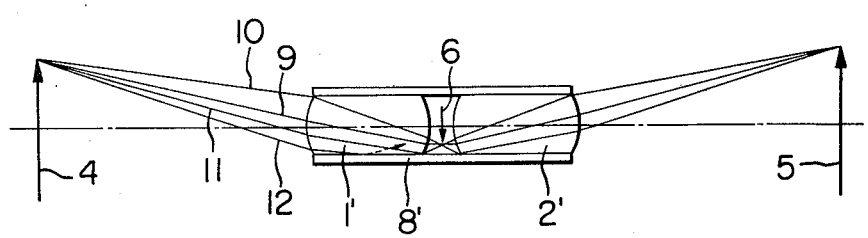
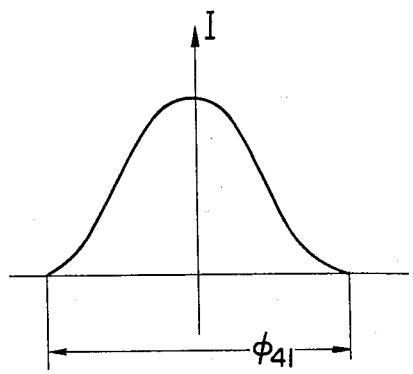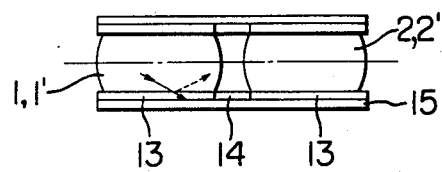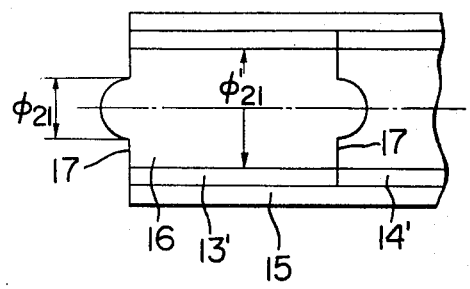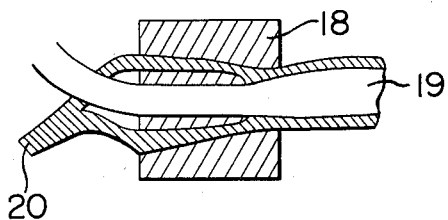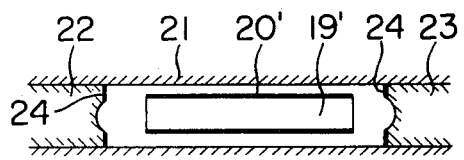

PROJECTION DEVICE

BACKGROUND OF THE INVENTION

1. Field of the Invention

This invention relates to a compact projection device which is suited for use with a copying machine of the slit exposure type and which is free of irregularity of exposure.

2. Description of the Prior Art

In the conventional projection device of a copying machine or the like, the projection lens system has comprised a single ocellar lens and due to the limitation of the angle of view taking the depth of focus into account, the conjugate from the surface of an object to the image plane has been long and this has necessarily led to a problem that the device is bulky. To eliminate such problem, there is known a projection device in which the projection lens system is formed by an ommateal lens having the same angle of view as that of the conventional lens and comprising a plurality of lenses in order to make compact the size of the entire copying machine and the projection lens system is endowed with a transmitting action which renders a part of an object to be projected upon individual lenses into a part of a corresponding image, whereby the entire lens system forms the projected image of the entire object on the plane of projection.

U.S. Pat. Nos. 3,584,952 and 3,592,542 disclose projection devices in which a plurality of lens systems are arranged along the lengthwise direction of a slit portion and a band-like area of an original to be copied is projected upon a photosensitive medium as a composite of partial images by these lens systems to thereby form an entire image. By making the lenses into an ommateal lens, the effective diameter of each lens is reduced and the conjugate corresponding to the same angle of view is shortened, thus rendering the entire device compact. That is, the projection device disclosed in the aforementioned U.S. Pat. No. 3,584,952 comprises three lenses in the direction of the optic axis, namely, front, intermediate and rear lenses, so that an intermediate image of a part of the original is formed on the intermediate lens disposed between the front lens and the rear lens by the front lens and this intermediate image is formed as the final image on the photosensitive medium by the rear lens. This intermediate lens functions as a field lens and has nothing to do with the original projecting action. However, this field lens has an important character in that it maintains uniform the brightness of the projected image formed on the photosensitive medium. Likewise, the projection device disclosed in the aforementioned U.S. Pat. No. 3,592,542 comprises three sets of two lenses, namely, two front lenses, two intermediate lenses and two rear lenses. In this device, three (or three sets of) lenses are disposed in the direction of the optic axis and it is difficult to set or otherwise adjust these lenses without eccentricity.

British Pat. No. 954,629 (complete specification issued on Apr. 8, 1964) discloses a lens having a great length in the direction of the optic axis thereof as compared with the effective diameter thereof.

However, the lens disclosed in this British patent is not a telecentric lens system, nor of the type in which an intermediate image is formed between a first lens and a second lens, nor of the type in which a predetermined distribution of intensity of light on the plane of projection is controlled. The lens described in the British patent is of the type in which the image of a part of an object is projected by a single lens system and this patent does not disclose that the images of individual parts are synthesized by a lens system array construction.

Japanese Patent Publication No. 30787/1970 shows an example of the projection lens system in which part images are synthesized by a lens system array and which adopts a telecentric arrangement. However, this projection lens system is an ordinary lens system and not a lens having a great length in the direction of the optic axis thereof as compared with the effective diameter thereof.

Our copending U.S. Application Ser. No. 889,404 discloses a construction having array-like projection optical systems each comprising a plurality of lenses, each of the projection optical systems having a first and a second lens so that an intermediate image of a part of an original is formed between the first and the second lens, each of the first and second lenses having a considerably great length in the direction of the optic axis as compared with the effective diameter thereof, the first lens being an emergence side telecentric system and the second lens being an incidence side telecentric system. Where such a lens system is applied to a copying machine or the like, it is desired that there be no irregularity of exposure and the present invention intends to meet such desire.

Optical fiber (tradename: Cellfock) having such an image forming action that the refractive index gradually decreases from the radially central portion thereof toward the marginal portion thereof is known from Japanese Patent Publication No. 28058/1972, etc., but the bar lens according to the present invention is such that the refractive index is uniform throughout the entire lens.

SUMMARY OF THE PRESENT INVENTION

It is the object of the present invention to provide a compact projection device which is suited for use with a copying machine of the slit exposure type and which is free of irregularity of exposure, and particularly a projection device in which some error of lens arrangement spacing is compensated for by superposition of the distributions of intensity of light on the plane of projection to thereby enable a uniform distribution to be easily obtained.

Such object may basically be achieved by using coaxially two bar lenses each having a great length in the direction of the optic axis thereof as compared with the effective diameter thereof to form an element lens system, initially setting a plurality of such element lens systems on a lens holding member having groove portions or hole portions extending in the direction of the optic axis, further arranging the element lens systems in two rows in a honeycomb-like fashion in which the element lens sytems of each row are positioned just intermediate the element lens systems of the adjacent row as viewed in the direction of the optic axis, using a light absorbing layer or a light scattering layer on the outer periphral portion of the lenses as a diaphragm extending in the direction of the optic axis without providing a diaphragm between the two lenses, namely, forming on the image plane by a lens aperture eclipse a distribution of intensity of light in which the intensity of light differs from at least the central area to the marginal area, and superposing the marginal area which is weaker in intensity of light than the central area upon the marginal area of at least one adjacent element lens system.

The invention will become more fully apparent from the following detailed description thereof taken in conjunction with the accompanying drawings.

BRIEF DESCRIPTION OF THE DRAWINGS

FIGS. 6 to 7 illustrate a second embodiment of the element lens system.

FIG. 8 illustrates prevention of stray light.

FIGS. 9 and 10 (a) and (b) illustrate a special form of the bar lens and the method of making the same.

DESCRIPTION OF THE PREFERRED EMBODIMENTS

Figure 1:
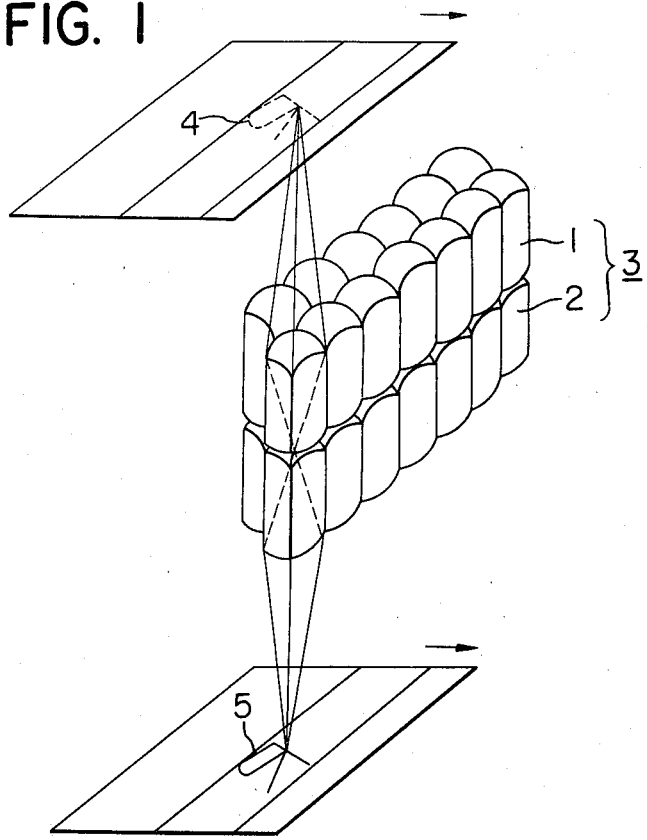
FIG. 1 is a schematic view of an ommateal lens system.

Referring to FIG. 1, an element lens system 3 comprises bar lenses 1 and bar lenses 2, and a slit-like area of an original surface 4 is projected upon the slit-like area of an image plane 5. The original surface 4 and the image plane 5 are moved in the direction of arrow.

Figure 2:
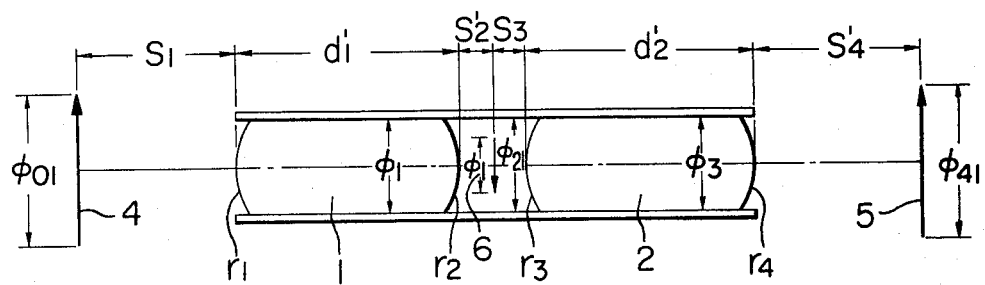
FIG. 2 illustrates various elements of an element lens system.

FIG. 2 shows various elements of the element lens system. An intermediate image 6 is formed between the bar lens 1 and the bar lens 2.

Figure 3:
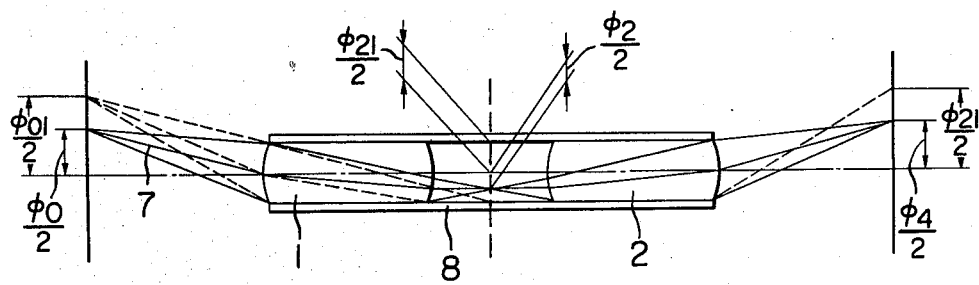
FIGS. 3 to 5 illustrate a first embodiment of the element lens system.
Figure 4:
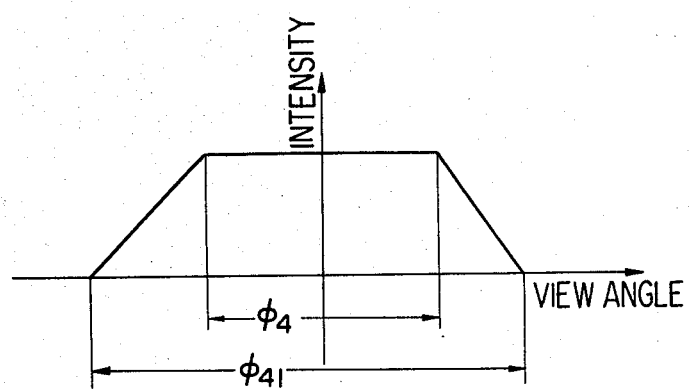
Figure 5:
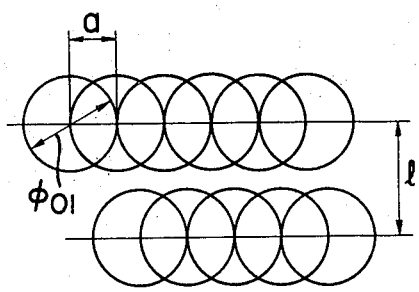

FIG. 3 shows a first embodiment of the element lens system. The principal light ray 7 enters the center of a first surface of the bar lens 1. The bar lens 1 is telecentric on the image side and the bar lens 2 is telecentric on the object side, and the principal light ray 7 exits from a second surface of the bar lens 1 in parallelism to the optic axis and enters a first surface of the bar lens 2. The second surface of the bar lens 1 and the first surface of the bar lens 2 function as a field lens as if they formed an air lens (a concave lens whose internal refractive index is smaller than its external refractive index is equivalent to the ordinary convex lens) and the light is transmitted to the image plane without loss of quantity of light. However, it should be noted here that the area of the object which is re-imaged on the plane of projection without loss of quantity of light is in the range of the limited area $\phi_0$ in the center, that is, in the range of the area $\phi_2$ on the intermediate image plane. If the inside diameter of a light beam control member 8 acting also as a bodytube is $\phi_{21}$, the light beam from the object area which is imaged in the area $\phi_{21}$ beyond $\phi_2$ on the intermediate image plane, namely, the area corresponding to $\phi_0$ to $\phi_{01}$ on the object surface, is kicked by the inner surface of the light beam control member 8 to thereby create an aperture eclipse. The degree thereof becomes greater from $\phi_0$ toward $\phi_{01}$ and at $\phi_{01}$, this aperture eclipse becomes 100%, that is, the light beam regularly transmitted into the plane of projection becomes zero. The cross-section of the distribution of intensity of light on the plane of projection at such time is shown in FIG. 4. In FIG. 4, the vertical axis represents the intensity of light and the horizontal axis represents the image height (angle of view). Here, $\phi_4$ and $\phi_{41}$ conjugately correspond to $\phi_0$ and $\phi_{01}$ on the object surface in the plane of projection. If optical systems which can provide such a distribution of intensity of light on the plane of projection are equidistantly arranged in a row of array, the distribution in the array direction with respect to the amount of exposure integrated in a direction perpendicular to the array direction is in the form of sine. Even the sine-form distribution of intensity of light can be allowed (the array includes not only one row but also a plurality of rows), but if the element lens system is arranged in the form of a honeycomb as shown in FIG. 5, the distribution in the direction of arrangement of the exposure amount integrated in a direction perpendicular to the direction of arrangement, namely, in the scanning direction, becomes substantially flat. Here, two rows of honeycomb-like arrangement may be made into a set to permit more arrangements. The spacing l between a first row and a second row is suitably determined in accordance with the slit width.

The above-described flatness is obtained in the range of several percent when the relation between the pitch a and the effective object view field $\phi_{01}$ satisfies the following condition.

$$K_1/2 \times \phi_{01} \leq a \leq K_2/2 \times \phi_{01} \quad (K_1=0.9, K_2=1.1)$$

Now, various elements of this element lens system will be described.

Let $n_1'$ be the main refractive index of the material of the bar lens 1, namely, the refractive index for a typical design wavelength, $\beta_1 (\equiv -|\phi_2/\phi_0|)$ be the lateral magnification of the intermediate image 6 to the object 4, and Fe be the object side effective F-number of the bar lens 1. Then, the following formula is established.

$$Fe = \frac{\sqrt{(S_1)^2 + (\frac{\phi_1}{2})^2}}{\phi_1} \quad (1)$$

Also, the relation between the magnification $\beta_1$ and the construction data of the lens is given by the following equation.

$$\beta_1 = \frac{1}{\{\phi_1 + \phi_2 - \phi_1 e_1' \phi_2\}S_1 + \{1 - e_1' \phi_2\}} \quad (2)$$

where
$\phi_1 \equiv n_1' - 1/r_1$ (refractive power of the first surface)
$\phi_2 \equiv 1 - n_1'/r_2$ (refractive power of the second surface)
$e_1' \equiv d_1'/n_1'$ Next, the condition on which the principal ray 7 of the incident light beam from the object, namely, the light ray passing through the center of the first surface exits from the second surface and thereafter emerges in parallelism to the optic axis is represented by the following equation because of the fact that the second focal length (i.e. $1/\phi_2$) is just equal and equivalent to $e_1'$.

$$1/\phi_2 = e_1' \quad (3)$$

Next, as the condition for which the light beam entering the bar lens 1 from the end of the effective object diameter $\phi_0$ is not kicked, the following relation is obtained because of the fact that the lower ray of the light beam passes through the first surface and thereafter travels along the edge of the bar lens 1 parallel to the optic axis.

$$\phi_1 = -1/S_1\{1+\phi_0/\phi_1\} \tag{4}$$

Finally, from the condition for which the distance $S_2'$ from the second surface of the bar lens 1 to the intermediate image position is maintained at a proper value in advance, the following relation becomes necessary.

$$S_2' = \beta_1 \times \{(1-\phi_1 e_1')S_1 - e_1'\} \tag{5}$$

By simultaneously solving conditions (1)–(5) with respect to $r_1, r_2; d_1', \phi_1; \phi_0$, the following result is primarily obtained.

$$r_1 = (n_1'-1) \times \frac{\beta_1 S_1}{[(1-\beta_1)-\frac{S_2'}{\beta_1 S_1}]} \tag{6}$$

$$r_2 = (1-n_1') \times \beta_1 S_1 \tag{7}$$

$$d_1' = n_1' \times \beta_1 S_1 \tag{8}$$

$$\phi_1 = \frac{-S_1/Fe}{\sqrt{1+(\frac{1}{2Fe})^2}} \tag{9}$$

$$\phi_0 = [\frac{(\frac{S_2'}{\beta_1})-S_1}{\beta_1 S_1} \times \phi_1] \tag{10}$$

Likewise, let $n_2'$ be the main refractive index of the material of the bar lens 2, namely, the refractive index for a typical design wavelength, $\beta_2 (= -|\phi_4/\phi_2|)$ be the lateral magnification of the last image to the intermediate image 6, and Fe' be the image side effective F-number. Then, the following formula is obtained:

$$Fe' = \frac{\sqrt{(S_4')^2 + (\frac{\phi_3}{2})^2}}{\phi_3} \tag{11}$$

The relation between the lateral magnification $\beta_2$ and the construction data of the bar lens 2 is given by the following equation:

$$\frac{1}{\beta_2} = \frac{1}{\{\phi_3+\phi_4-\phi_3 e_2'\phi_4\}(-S_4')+1-e_2'\phi_3\}} \tag{12}$$

where
$\phi_3 \equiv n_2' - 1/r_3$ (refractive power of the first surface
$\phi_4 \equiv 1 - n_2'/r_4$ (refractive power of the second surface
$e_2' \equiv d_2'/n_2'$ Next, in order that the incident light beam having a principal ray parallel to the optic axis may pass through this bar lens without excess and deficiency for the effective diameter $\phi_3$ of the bar lens, it is desirable that the second surface of this bar lens have an exit pupil. From this requirement, the following relation is obtained because of the fact that the focal length of the first surface (i.e. $1/\phi_3$) is equal and equivalent to $e_2'$.

$$1/\phi_3 = e_2' \tag{13}$$

Next, as the condition for which the light beam entering the bar lens 2 from the end of the effective intermediate image diameter $\phi_2$ is not kicked, the following relation is obtained because of the fact that the lower light ray of the light beam passes through the first surface and thereafter travels along the edge of the bar lens 2 parallel to the optic axis.

$$\phi_4 = 1/S_4'\{1+\phi_4/\phi_3\} \tag{14}$$

Finally, from the condition for which the distance $S_3$ from the first surface of the bar lens 2 to the intermediate image position is maintained at a proper value in advance, the following relation becomes necessary.

$$S_3 = 1/\beta_2 \times \{(1-\phi_4 e_2')S_4' + e_2'\} \tag{15}$$

By simultaneously solving conditions (11)–(15) with respect to $r_3, r_4, d_2', \phi_3$ and $\phi_4$, the following result is primarily obtained.

$$r_3 = (1-n_2') \times \frac{S_4'}{\beta_2} \tag{16}$$

$$r_4 = (n_2'-1) \times \frac{S_4'/\beta_2}{[(1-\frac{1}{\beta_2})-\frac{S_3 \times \beta_2}{S_4'}]} \tag{17}$$

$$d_2' = -n_2' \times S_4'/\beta_2 \tag{18}$$

$$\phi_3 = \frac{S_4'/Fe'}{\sqrt{1-(\frac{1}{2Fe'})^2}} \tag{19}$$

$$\phi_4 = [\frac{S_3\beta_2 - S_4'}{S_4'/\beta_2}] \times \phi_3 \tag{20}$$

Here, from the condition on which the last image is at erect one-to-one magnification, the following equations are obtained:

$$\beta_2 = 1/\beta_1 \tag{21}$$

$$Fe' = Fe \tag{22}$$

Further, in order that the bar lens 1 and the bar lens 2 may be common to each other, the following relations become necessary:

$r_3 = -r_2, r_4 = -r_1, d_2' = d_1', n_2' = n_1', \phi_3 = \phi, \phi_4 = \phi_0,$
$\beta_2 = 1/\beta_1, S_3 = -S_2', S_4' = -S_1, Fe' = Fe.$ Here, the design values of Examples 1 to 10 in which the bar lens 1 and the bar lens 2 are disposed symmetrically with respect to the intermediate image plane will be shown in the table below.

| | $\phi_0,\phi_4$ | $\phi_1,\phi_3$ | $S_2', -S_3$ | $S_1, -S_4'$ | $\beta_1, \frac{1}{\beta_2}$ | $n_1', n_2'$ | Material | $r_1$ | $r_2$ | $r_3$ | $r_4$ | $d_1', d_2'$ |
|---|---|---|---|---|---|---|---|---|---|---|---|---|
| Example 1 | 3 | 2 | 1 | −20 | −0.612 | 1.491 | Acrylic | 3.93 | −6.01 | 6.01 | −3.93 | 18,25 |
| Example 2 | 3 | 2 | 1 | −20 | −0.612 | 1.590 | Styrene | 4.72 | −7.22 | 7.22 | −4.72 | 19,46 |
| Example 3 | 3 | 2 | 1 | −20 | −0.612 | 1.586 | Lexan | 4.69 | −7.17 | 7.17 | −4.69 | 19,41 |
| Example 4 | 3 | 2 | 1 | −20 | −0.612 | 1.571 | SAN | 4.57 | −6.99 | 6.99 | −4.57 | 19,23 |
| Example 5 | 3 | 2 | 1 | −20 | −0.612 | 1.562 | NAS | 4.50 | −6.88 | 6.88 | −4.50 | 19,12 |
| Example 6 | 3 | 2 | 1 | −20 | −0.612 | 1.466 | TPX | 3.73 | −5.70 | 5.70 | −3.73 | 17,94 |
| Example 7 | 3 | 2 | 1 | −20 | −0.612 | 1.51633 | BK7 | 4.13 | −6.32 | 6.32 | −4.13 | 18,56 |

-continued

| | $\phi_o, \phi_4$ | $\phi_1, \phi_3$ | $S_2', -S_3$ | $S_1, -S_4'$ | $\beta_1, \frac{1}{\beta_2}$ | $n_1', n_2'$ | Material | $r_1$ | $r_2$ | $r_3$ | $r_4$ | $d_1', d_2'$ |
|---|---|---|---|---|---|---|---|---|---|---|---|---|
| Example 8 | 3 | 2 | 1 | −20 | −0.612 | 1.72916 | LAK18 | 5.83 | −8.92 | 8.92 | −5.83 | 21,16 |
| Example 9 | 3 | 2 | 1 | −20 | −0.612 | 1.80518 | SF6 | 6.44 | −9.86 | 9.86 | −6.44 | 22,10 |
| Example 10 | 2 | 2 | 1 | −15.05 | −0.42 | 1.51633 | BK7 | 2.58 | −3.2 | 3.2 | −2.58 | 9,5 |

Another embodiment of the element lens system is shown in FIG. 6. Here, the principal light ray 9 will be described. When a light ray 10 entering the upper end of the first surface of the bar lens 1' from the end of the effective object view field and a light ray 11 passing through the lower end of the second surface of the bar lens 1' from the end of the effective object view field are considered, a light ray exiting just from the middle of the second surface exit height of the light rays 10 and 11 and travelling toward the bar lens 2' in parallelism to the optic axis, namely, the center of the emergent light beam, is regarded as a principal ray 9. That is, the bar lens 1' is telecentric on the image side and the bar lens 2' is telecentric on the object side, and the light having formed an intermediate image is efficiently re-imaged on the plane of projection by the bar lens 2' without loss of quantity of light. Thus, by making the bar lenses 1' and 2' into telecentric lenses, the image side surface of the bar lens 1' and the object side surface of the bar lens 2' perform the function as a field lens as if they formed an air lens (a concave lens whose internal refractive index is smaller than its external refractive index is equivalent to the ordinary convex lens). It is a feature of the optical system according to the present invention to present substantially Gaussian distribution when the horizontal axis represents the image height (angle of view) and the vertical axis represents the intensity of light I on the image plane, as shown in FIG. 7. Here, $\phi_{41}$ conjugately corresponds to $\phi_{01}$ on the object surface.

In FIG. 6, the light ray 11 travels toward the lower end of the second surface of the bar lens 1', while the light ray 12 further lower than the light ray 11 passes through the first surface of the bar lens 1' and thereafter reaches a light beam control member 8' acting also as a bodytube and is attenuated thereby. The effective light beam entering the entrance pupil, namely, the first surface of the bar lens 1' enters a predetermined partial area of the effective lens diameter, namely, the substantial lens aperture and the aperture eclipse is varied by the image height (angle of view) so that the intensity distribution on the plane of projection becomes a Gaussian form. The light beam control member 8' serves as a diaphragm extending in the direction of the optic axis and has an important character as the means for preventing any unnecessary light ray from being transmitted and for controlling the desired distribution of intensity of light.

Another feature of the optical system according to the present invention is that the lateral magnification is made small and the effective object view field is made large, namely, the lens is made to have a wide angle. That is, when optical systems which can be made to have such Gaussian form of distribution of intensity of light on the plane of projection are equidistantly arranged in more than one row of parallel arrays, the effective object view fields in the respective lens systems multiplexly overlap one another and the distribution in the direction of arrangement with respect to the quantity of light integrated in a direction perpendicular to the array direction, namely, in the scanning direction, becomes substantially uniform. The uniformity will be further enhanced if a honeycomb-like arrangement is adopted instead of more than one row of parallel arrangements. The spacing between a first row and a second row is suitably determined in accordance with the slit width. With a staggered two-row arrangement as the standard, more arrangements may be adopted.

As regards the aforementioned more than one row of parallel arrays, when the effective diameter of the lens to be described is $\phi_1$ and the pitch is a, uniformity in the range of several percent may be obtained by satisfying the following condition:

$$K_1 \times \phi_1 < a < K_2 \times \phi_1 \quad (K_1 = 1.18, K_2 = 1.36)$$

Now, like the previous embodiment, various elements of the lens will be described.

First, from the definition of F-number, $$Fe \equiv \frac{\sqrt{S_1^2 + (\frac{\phi_1}{2})^2}}{\phi_1} \tag{23}$$

Also, from paraxial pursuit, $$\beta_1 = \frac{1}{(\phi_1 + \phi_2 - \phi_1 e_1' \phi_2) S_1 + (1 - e_1' \phi_2)} \tag{24}$$

where $\phi_1 \equiv n_1' - 1/r_1$ (refractive power of the first surface)
$\phi_2 \equiv 1 - n_1'/r_2$ (refractive power of the second surface)
$e_1' \equiv d_1'/n_1'$ Next, from the condition on which the principal light ray of the effective incident light beam from the object exits from the second surface and thereafter emerges in parallelism to the optic axis, the following relations are shown:

$$\phi_2 = 2/e_1' \tag{25}$$

$$\phi_1 = -1/S_1 \tag{26}$$

Also, from the condition on which the opening efficiency at the necessary maximum angle of view becomes zero, the following relation becomes necessary.

$$\phi_0 = \frac{-2 \times S_1 \times \phi_1}{e_1'} \tag{27}$$

Finally, from the condition for which the distance $S_2'$ from the second surface of the bar lens 1' to the intermediate image position is maintained at a proper value in advance, the following relation becomes necessary:

$$S_2' = 1/\phi_2 \tag{28}$$

By solving conditions (23) to (28) with respect to $r_1$, $r_2$, $d_1'$, $\phi_1$ and $\phi_0$, the following results are primarily obtained.

$$r_1 = -(n_1' - 1)S_1 \tag{29}$$

$$r_2 = S_1 \times \beta_1 \times (1 - n_1') \tag{30}$$

$$d_1' = 2 \times n_1' \times S_1 \times \beta_1 \tag{31}$$

$$\phi_1 = \frac{-S_1/Fe}{\sqrt{1 - (\frac{1}{2Fe})^2}} \tag{32}$$

$$\phi_0 = -\frac{\phi_1}{\beta_1} \tag{33}$$

The bar lens 2' will now be described.

The lateral magnification for the image 6 is represented by $\beta_2(=-|\phi_4/\phi_2|)$. The image side effective F-number of this bar lens 2' is represented by $Fe'$.

The effective F-number determined from the condition concerning the brightness of the projected image is:

$$Fe' = \frac{\sqrt{(S_4')^2 + (\frac{\phi_3}{2})^2}}{\phi_3} \tag{34}$$

$$\frac{1}{\beta_2} = \frac{1}{(\phi_3 + \phi_4 - \phi_3 e_2' \phi_4)(-S_4') + (1 - e_2'\phi_3)} \tag{35}$$

where $\phi_3 \equiv n_2' - 1/r_3$ (refractive power of the first surface)
$\phi_4 \equiv 1 - n_2'/r_4$ (refractive power of the second surface)
$e_2' \equiv d_2'/n_2'$ Next, from the condition on which the principal ray of the effective incident light beam from the object is parallel to the optic axis when entering the first surface of the bar lens 2', $$\phi_3 = 2/e_2' \tag{36}$$

$$\phi_4 = 1/S_4' \tag{37}$$

From the condition on which the opening efficiency is zero at the required maximum angle of view, the following relation becomes necessary.

$$\phi_4 = \frac{2 \times S_4' \times \phi_3}{e_2'} \tag{38}$$

Finally, from the condition for which the distance $S_3$ from the first surface of the bar lens 2' to the intermediate image position is maintained at a proper value in advance, the following relation becomes necessary.

$$S_3 = -1/\phi_3 \tag{39}$$

By simultaneously solving conditions (34) to (39) with respect to $r_3$, $r_4$, $d_2'$, $\phi_3$ and $\phi_4$, the following results are primarily obtained.

$$r_3 = S_4' \times \frac{1}{\beta_2} \times (1 - n_2') \tag{40}$$

$$r_4 = (1 - n_2') \times S_4' \tag{41}$$

$$d_2' = -2 \times n_2' \times S_4' \times \frac{1}{\beta_2} \tag{42}$$

$$\phi_3 = \frac{S_4'/Fe'}{\sqrt{1 - (\frac{1}{2Fe'})^2}} \tag{43}$$

$$\phi_4 = -\beta_2 \times \phi_3 \tag{44}$$

Here, from the condition on which the last image is at erect one-to-one magnification, the following equations are obtained.

$$\beta_2 = 1/\beta_1 \tag{45}$$

$$Fe' = Fe \tag{46}$$

In order that the bar lens 1' and the bar lens 2' may be common to each other, the following relations become necessary.

$r_3 = -r_2$, $r_4 = -r_1$, $d_2' = d_1'$, $n_2' = n_1'$, $\phi_3 = \phi_1$, $\phi_4 = \phi_0$,
$\beta_2 = 1/\beta_1$, $S_3 = -S_2'$, $S_4' = -S_1$, $Fe' = Fe$ By this, the projection optical system is simplified.

Further, the inventor has confirmed through experimental designing that the bar lens 1' and the bar lens 2' may be of the order of $\pm 10\%$ from the previous conditions (29) to (33) and (40) to (44). That is, $-K_1 \times S_1 \times (n_1' - 1) \leq r_1 \leq -K_2 \times S_1 \times (n_1' - 1)$
$K_2 \times S_1 \times \beta_1 \times (1 - n_1') \leq r_2 \leq K_1 \times S_1 \times \beta_1 \times (1 - n_1')$
$2 \times K_1 \times n_1' \times S_1 \times \beta_1 \leq d_1' \leq 2 \times K_2 \times n_1' \times S_1 \times \beta_1$ $$K_1 \times \frac{-S_1/Fe}{\sqrt{1 - (\frac{1}{2Fe})^2}} \leq \phi_1 \leq K_2 \times \frac{-S_1/Fe}{\sqrt{1 - (\frac{1}{2Fe})^2}}$$

$-K_1 \times \frac{\phi_1}{\beta_1} \leq \phi_0 \leq -K_2 \times \frac{\phi_1}{\beta_1}$ $K_1 \times S_4' \times \frac{1}{\beta_2} \times (1 - n_2') \leq r_3 \leq K_2 \times S_4' \times \frac{1}{\beta_2} \times (1 - n_2')$ $K_2 \times S_4' \times (1 - n_2') \leq r_4 \leq K_1 \times S_4' \times (1 - n_2')$ $-2 \times K_1 \times n_2' \times S_4' \times \frac{1}{\beta_2} \leq d_2' \leq -2 \times K_2 \times n_2' \times S_4' \times \frac{1}{\beta_2}$ $$K_1 \times \frac{S_4'/Fe'}{\sqrt{1 - (\frac{1}{2Fe'})^2}} \leq \phi_3 \leq K_2 \times \frac{S_4'/Fe'}{\sqrt{1 - (\frac{1}{2Fe'})^2}}$$

$-K_1 \times \beta_2 \times \phi_3 \leq \phi_4 \leq -K_2 \times \beta_2 \times \phi_3$ where $K_1 = 0.9$, $K_2 = 1.1$.

With these conditions taken into account, data will be shown in the table below.

| | $\phi_0, \phi_4$ | $\phi_1, \phi_3$ | $S_2', -S_3$ | $S_1, -S_4'$ | $\beta_1, \frac{1}{\beta_2}$ | $n_1', n_2'$ | Material | $r_1$ | $r_2$ | $r_3$ | $r_4$ | $d_1', d_2'$ |
|---|---|---|---|---|---|---|---|---|---|---|---|---|
| 1 | 5.6 | 1.1 | 4.6 | −23.5 | −0.2 | 1.491 | Acrylic | 11.54 | −2.27 | 2.27 | −11.54 | 13.8 |
| 2 | 6.2 | 1.1 | 5.2 | −29.5 | −0.18 | 1.491 | Acrylic | 14.49 | −2.57 | 2.57 | −14.49 | 15.6 |
| 3 | 4. | 1.1 | 5.1 | −18.4 | −0.28 | 1.491 | Acrylic | 9.03 | −2.48 | 2.48 | −9.03 | 15.1 |
| 4 | 5.6 | 1.1 | 4.6 | −23.5 | −0.2 | 1.5163 | BK7 | 11.74 | −2.3 | 2.3 | −11.74 | 13.8 |
| 5 | 6.2 | 1.1 | 5.2 | −29.5 | −0.18 | 1.5163 | BK7 | 14.74 | −2.61 | 2.61 | −14.74 | 15.6 |

| $\phi_0,\phi_4$ | $\phi_1,\phi_3$ | $S_2', -S_3$ | $S_1, -S_4$ | $\beta_1, \frac{1}{\beta_2}$ | $n_1', n_2'$ | Material | $r_1$ | $r_2$ | $r_3$ | $r_4$ | $d_1', d_2'$ |
|---|---|---|---|---|---|---|---|---|---|---|---|
| 6 | 4. | 1.1 | 5.1 | −18.4  −0.28 | 1.5163 | BK7 | 9.5 | −2.52 | 2.52 | −9.5 | 15.1 |

Now, as regards the prevention of the internal surface reflection, there is a method of making the outer peripheral surface of the bar lens parallel to the optic axis into a coarse surface and embedding or painting the coarse surface portion with a light absorbing material. There is a further method of coating the exterior of the bar lens with a light absorbing layer 13 having substantially the same refractive index as that of the light transmitting substance forming the bar lens, as shown in FIG. 8, thereby preventing the internal surface reflection on the outer peripheral portion of the bar lens. The light reaching the outer peripheral portion of the bar lens is all transmitted to the light absorbing portion having no difference in refractive index and is absorbed and attenuated thereby. The light absorbing layer 13 is applied onto the bar lens and held by the bodytube 15. Of course, the light absorbing layer 13 and the bodytube 15 may be made integral with each other.

A light absorbing layer 14 is provided also between the bar lens 1,1' and the bar lens 2,2' and any light ray exceeding the effective diameter area is attenuated by this portion. The light absorbing layer 14 contacts the air and therefore, the refractive index difference therein cannot usually be nulled, but a layer which may prevent the internal surface reflection as much as possible and completely eliminate stray light is desirable as the light absorbing layer 14 and for example, a layer having its internal surface formed as a coarse surface or a light absorbing surface is available.

Now, the light intercepting effect is related to the thickness d of the light absorbing portion and the absorption coefficient $\mu$, and the relation thereof with the transmission factor T is given by the following formula.

$$T \propto e^{-\mu d}$$

In the element lens system of the present projection device, where use is made of acryl having a black pigment mixed therewith, T=8% for d=0.2 mm and a sufficient effect of internal surface reflection prevention is provided.

As the light transmitting substance (lens material), there is transparent acrylic resin and as the light absorbing substance, there is black acrylic resin, but use may also be made of transparent plastics such as styrol or polycarbonate as the light transmitting substance and colored plastics as the light absorbing substance. Of course, the light transmitting substance may alternatively be glass. A plastic lens or the like is usually liable to electrostatically attract dust or the like and therefore, it is better to use, as the lens material, a material having an anti-electrostatic agent mixed therewith or to apply an anti-electrostatic agent to the surface of a shaped lens.

In the foregoing, the effective diameter and the outside diameter of the bar lens have been described as equal, but a system in which any light ray exceeding the effective diameter area is eliminated even if the outside diameter $\phi_{21}'$ of the bar lens 16 differs from the effective diameter $\phi_{21}$ thereof will suffice. Here, it is necessary that the area 17 of the first and second surfaces of the bar lens outside of the effective diameter do not permit any light to enter the interior of the lens as a coarse surface or a light absorbing surface.

Reference is now had to FIGS. 10 (a) and (b) to describe a method of making such bar lens. First, as shown in FIG. 10 (a), transparent acryl 19 is cast into the central portion of a mold 18 and black acryl 20 is cast into the marginal portion of the mold 18 and a core member for bar lens is formed by the extrusion technique. This core member for bar lens having a dual construction (for example, bar-like acryl) is cut into predetermined dimensions and then, as shown in FIG. 10 (b), is placed into a mold 21, whereafter a mold 23 slidable with respect to the mold 21 is pressed against a reception mold 22 under a suitable temperature environment, whereby a bar lens having spherical portions at the opposite ends thereof is formed. The molds 22 and 23 have concave portions in the centers thereof and these correspond to the effective diameter area of the lens, and the marginal portions 24 thereof provide coarse surfaces which contribute to the formation of coarse surfaces in the corresponding portions of the bar lens. By this, the effective diameter area of the lens is prevented from being kicked by the parallel deviation between the core member for bar lens and the concave portion of the mold, that is, the error in manufacturing can be allowed.

Now, in an element lens system comprising two bar lenses, the following matters are required in terms of optical performance.

(1) that the two bar lenses forming each element lens system are coaxial, namely, free of eccentricity;

(2) that the two bar lenses forming each element lens system are accurately set at predetermined positions in the direction of the optic axis; and (3) that the internal surface reflection is eliminated in each element lens system and extraneous stray light is intercepted.

When bar lenses are arranged in a predetermined direction in a plane perpendicular to the optic axis and applied to the projection device or the like of a copying machine, a plurality of first bar lenses or object side lenses are arranged in a direction perpendicular to the optic axis to form a first lens block, and separately therefrom, a plurality of second bar lenses or image side lenses are arranged to form a second lens block, whereafter these two lens blocks are coupled to form a projection device and in this case, it usually requires a technique of very high accuracy due to mutual pitch errors to make the lenses coaxial throughout each element lens system. In the projection device to which the present invention is applied, the outside diameter of the lenses and the eccentricity of the lens surfaces are controlled and each element lens system is initially set coaxially. By this, the two bar lenses are necessarily made coaxial throughout each element lens system and the optical performance thereof is enhanced. Also, the setting of the position in the direction of the optic axis can be accurately accomplished by the use of a tool or by providing a standard position in the lenses themselves.

Figure 11A:
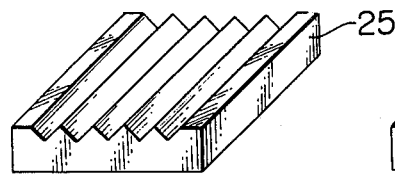
FIGS. 11A, 11B, 12A, 12B, 12C, 13A, 13B, 14-16, 17A, 17B, 18A and 18B illustrate a first embodiment of the present invention using grooved blocks as a lens holding member.
Figure 11B:
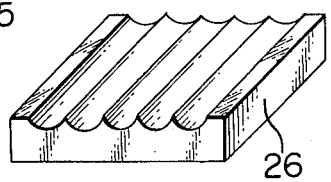
Figure 12A:
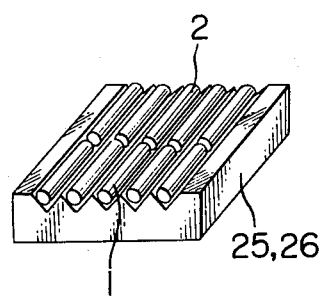
Figure 12B:
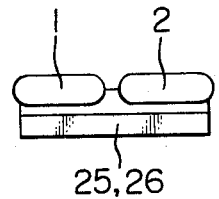
Figure 12C:
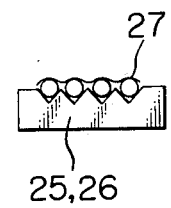
Figure 13A:
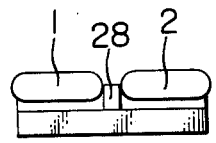
Figure 13B:
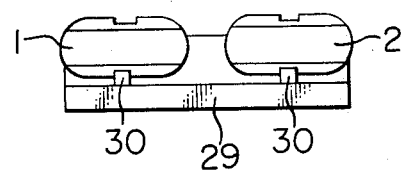
Figure 14:
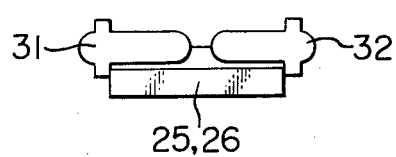

FIGS. 11 to 18 refer to arrangements in which the element lens systems are arranged along and in the groove portions of a grooved block having V-shaped or rounded grooves in the direction of the optic axis. FIGS. 11 (a) and (b) show grooved blocks 25 and 26 having V-shaped grooves and rounded grooves, respectively. The element lens systems are arranged along and in the grooves in the direction of the optic axis, as shown in FIG. 12 (a), and the cross-section thereof taken in the direction of the optic axis is as shown in FIG. 2 (b). The bar lenses arranged along the grooves are pressed as by a sheet 27 as shown in FIG. 12 (C), and coupled to the grooves by a light absorbent adhesive agent or the like. This sheet 27 prevents stray travel of light between the element lens systems. Particularly, where the element lens systems are arranged in more than two rows, the light interception by the sheet disposed between the rows is important. Of course, the sheet is not requisite but the light interception may be accomplished by another means. Also, the aforementioned stray light between the element lens systems arises chiefly from between the opposed lens end surfaces if light intercepting means is provided on the side surface of the first and second bar lenses. In that case, an intermediate ring may be used as the spacer for positioning the end surfaces of the first and second lenses and utilized as a member for preventing stray light and internal surface reflection. In that case, however, the intermediate ring must be opaque and the inner surface thereof must have been subjected to the internal surface reflection preventing process. The lens position setting in the direction of the optic axis can be accomplished by controlling the spacing between two bar lenses having a uniform diameter by means of a tool 28, as shown in FIG. 13 (a), and the bar lenses 1 and 2 can be made to follow the end surface of the tool. Another means for position-setting in the direction of the optic axis may be provided by providing one or more grooves in the area other than the effective lens diameter, as shown in FIG. 13 (b), providing a grooved block 29 with projections 30 corresponding thereto, and fitting the two together. Also, if use is made of stepped bar lenses 31 and 32 as shown in FIG. 14, the position setting in the direction of the optic axis will become easy.

Figure 15:
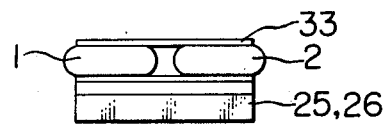
Figure 16:
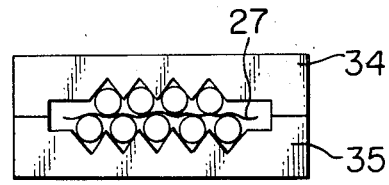
Figure 17A:
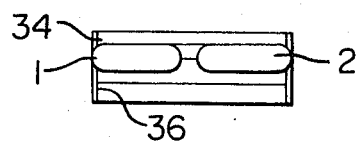
Figure 17B:
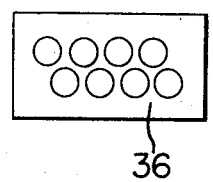

In the above-described arrangement, the bar lenses themselves are arranged along and in the grooves, but as shown in FIG. 15, bar lenses having a uniform diameter may be inserted into pipes 33 and such pipes 33 may be arranged along the grooves of the grooved blocks 25 and 26. In this case, the inside and outside diameters of the pipes and the eccentricity of the lens surface must be controlled. Also, the bar lenses may be stepped ones. Now, the element lens systems fixed to the grooved blocks 25 and 26 may, in ordinary cases, be used as they are, but where there is a number of element lens systems, these must be incorporated while being piled upon one another. In that case, if the element lens systems are assembled so as to jostle one another with the sheet 27 interposed therebetween as shown in FIG. 16, the eccentricity between the lenses arising from the warp or twist of the grooved blocks 34 and 35 may be corrected. Also, the clearances between the adjacent element lens systems should desirably be filled with a light absorbent adhesive agent (bulking agent). Also, when the grooved blocks are arranged in multiple stages, if they are disposed in the so-called honeycomb-like array wherein adjacent rows are offset from each other by a half pitch each, the uniformity of the distribution of quantity of light integrated in the scanning direction will be improved. The material of the grooved blocks may preferably be a metal such as aluminum in terms of strength, but in the case of a copying machine or the like, plastics such as phenol resin or polycarbonate resin is more desirable in view of the problem of discharging between the grooved blocks and the photosensitive drum or the charger. Also, the sheet 27 may desirably be formed of flexible plastics or like material. As already noted, the sheet 27 is not requisite but the adjacent bar lenses may circumscribe each other. Now, when the bar lenses are arranged along the grooves and if they are left as they are, other light than the desired effective light beam comes into the lenses and therefore, to intercept the leak light from the clearances between the lenses and the grooved blocks, a mask 36 formed with holes substantially corresponding to the effective lens diameter areas as shown in FIGS. 17 (a) and (b) is installed in the vicinity of the object side end surface (entrance pupil surface) of the grooved blocks 25 and 26 or in the vicinity of the object side or the image side end surface of the element lens systems. The mask 36 may be a thin metal sheet or a plastic sheet and may be formed by pressing, etching, electric casting or molding, and the mounting thereof may be accomplished by the use of an adhesive agent, screws, thermal force fastening, fusion or snap fitting.

The arrangement as described above leads to the provision of a highly accurate projection optical system.

Figure 18A:
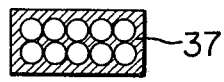
Figure 18B:
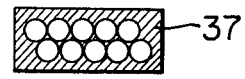

If the element lens systems comprising bar lenses inserted into circular or polygonal pipes as shown in FIGS. 18 (a) and (b) are coupled together as by a light absorbed or light non-transmitting adhesive agent 37 so that the outer peripheral portions thereof circumscribe one another, there may be provided a low-cost projection device.

More specifically, lens units are arranged on a standard surface and piled in at least one row, and the optic axis thereof is determined in a predetermined direction, and the lens units are then arranged at intervals substantially equal to the outside diameter of the pipes with the heights of the lens surfaces being uniformized. FIG. 18 (a) shows a construction in which the lens units are piled in parallel rows and FIG. 18 (b) shows a construction in which the lens units are arranged in a honeycomb-like form wherein the adjacent stages are offset from each other by a half pitch each. Both of these arrangements lead to improved uniformity of the distribution of quantity of light integrated in the scanning direction.

Available as the light absorbent adhesive agent (bulking agent) is black or nearly black epoxy resin, polyester resin or acrylic resin. Where the clearances are wide, an additive such as powdered metal or glass fiber may more preferably be mixed with the adhesive agent (bulking agent) to reduce the solidification and contraction thereof.

In the foregoing, the element lens systems have been described as being set in the grooves of the grooved blocks which are lens holding members, and reference is now had to FIGS. 19 to 22 to describe a system using holes formed in a unitary black as the lens holding member.

Figure 19:
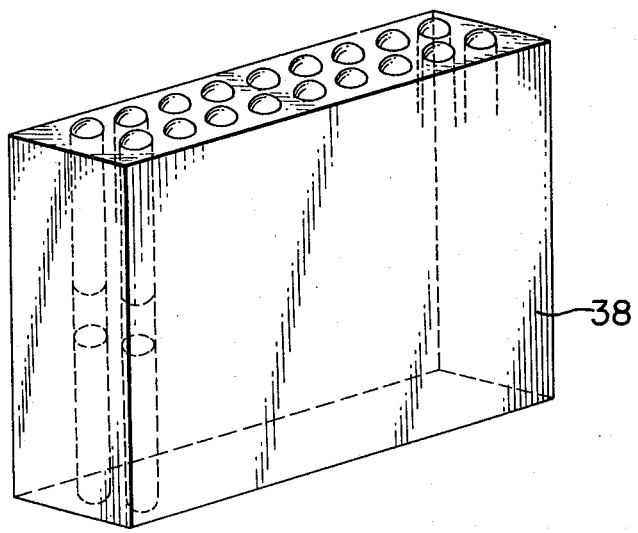
FIGS. 19, 20A, 20B, 20C, 21A, 21B, 21C, 22A, 22B and 22C illustrate a second embodiment of the present invention using a unitary block as a lens holding member.
Figure 20A:
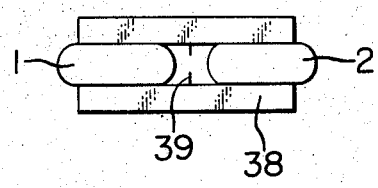
Figure 21A:
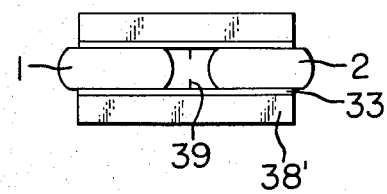
Figure 20B:
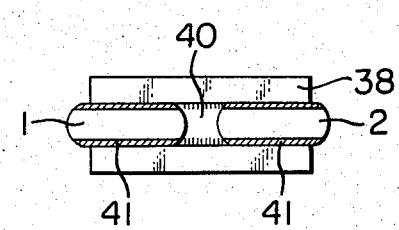
Figure 21B:
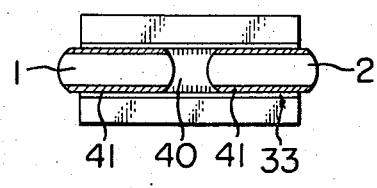
Figure 20C:
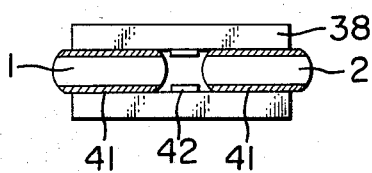
Figure 21C:
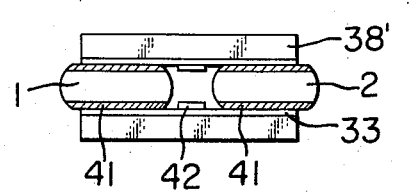
Figure 22A:
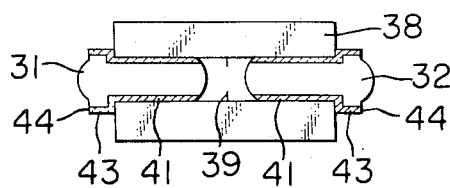
Figure 22B:
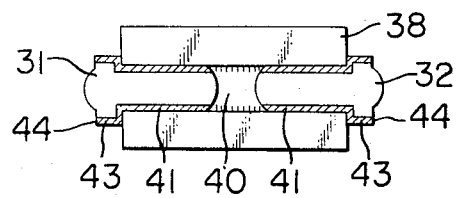
Figure 22C:
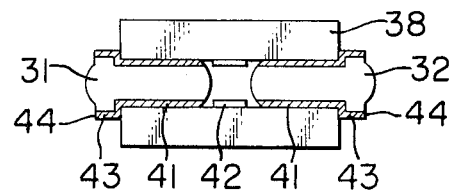

In FIG. 19, the element lens systems are equidistantly and highly accurately controlled in a two-row honeycomb-like fashion in the holes formed in a unitary block 38. The cross-sections in the direction of the optic axes thereof are shown in FIGS. 20 to 22. The block 38 is formed therethrough holes for controlling the positions of the element lens systems, but where it is difficult to form long through-holes, thin sheets formed with apertures may be layered to form a block.

In FIG. 20 (a), bar lenses 1 and 2 having an equal diameter are held by the through-holes in the block 38. An intermediate diaphragm 39 for controlling the effective light beam is provided between the bar lenses 1 and 2. In FIG. 20 (b), the inside diameter area 40 of the intermediate portion of the through-hole is made into a coarse surface and the bar lenses 1 and 2 are coated with a light absorbing layer 41 having the same refractive index as that of the material of the bar lenses.

In FIG. 20 (C), an intermediate ring 42 is inserted into the intermediate portion of the through-hole to control the light beam. Likewise, FIGS. 21 (a), (b) and (c) show systems in which the bar lenses 1 and 2 of FIGS. 20 (a), (b) and (c) are coupled together by a pipe 33. FIGS. 22 (a), (b) and (c) show systems in which the element lens systems comprising the bar lenses described in connection with FIG. 9 are controlled by through-holes formed in the block 38. The side surfaces of the bar lenses 31 and 32 at the object side end and the image side end thereof is coated with a light absorbing layer 43, and the areas 44 of the bar lenses extending beyond the effective diameter area are made into coarse surfaces. The light absorbing layer 43 may be made integral with the light absorbing layer 41, and the areas 44 may also be light absorbing surfaces.

Figure 23:
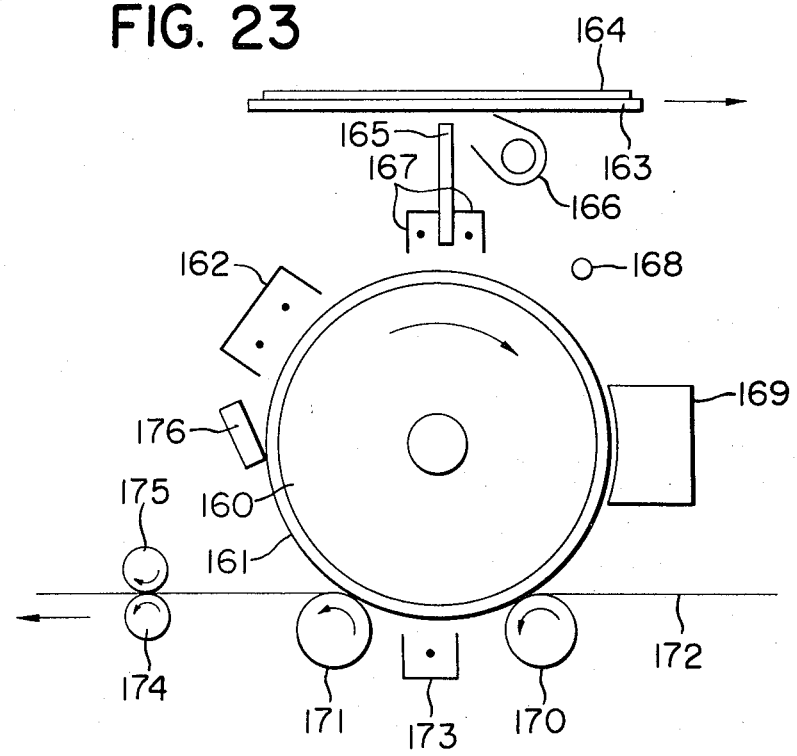
FIG. 23 illustrates the process when the present invention is applied to a copying machine.

An embodiment in which the projection device thus produced is applied to a copying machine is shown in FIG. 23. In FIG. 23, a drum 160 is rotatively driven at a constant velocity in the direction of arrow by a motor, not shown, and has on the outer periphery thereof a photosensitive medium 161 comprising an electrically conductive substrate, a photoconductive layer and a transparent insulating surface layer successively layered in the named order. This photosensitive medium 161 is first subjected to uniform charge by a corona discharger 162, and the polarity of the charge is positive when the photoconductive layer is an N-type semiconductor and negative when the photoconductive layer is a P-type semiconductor. Subsequently, the photosensitive medium 161 is exposed to the image light from an original 164 resting on a transparent original carriage 163 moved in the direction of arrow in synchronism with the rotation of the drum 160 and at a velocity resulting from multiplying the peripheral velocity of the drum 160 by the inverse number of the image forming magnification (in the case of one-to-one magnification image formation, at the same velocity as the peripheral velocity of the drum 160). This image is formed on the photosensitive medium 161 by a projection device 165. The area of the original 164 to which the projection device 165 is opposed, namely, the area of the original which is imaged on the photosensitive medium 161, is illuminated by an illuminating system 166 comprising a lamp and a reflector. Here, for example, by adjusting the quantity of illuminating light, the amount of exposure of the photosensitive medium 161 can be adjusted.

Simultaneously with the application of the image light by the projection device 165, the photosensitive medium 161 is subjected to the discharging action by a corona discharger 167 opposite in polarity to the AC corona discharger 162, whereby a charge pattern corresponding to the light image of the original 164 is formed on the photosensitive medium 161, and the whole surface of this photosensitive medium 161 is uniformly exposed to the light from a lamp 168, thereby forming an electrostatic latent image of good contrast on the photosensitive medium. The latent image so formed is developed into a toner image by a developing device 169 of the cascade type or of the magnet brush type. Then, this toner image is transferred to transfer paper 172 fed from supply means, not shown, to the photosensitive medium 161 at the same velocity as the photosensitive medium and brought into contact therewith by rollers 170 and 171. To enhance the image transfer efficiency, a charge opposite in polarity to the toner forming the developed image is imparted to the back side of the transfer paper 172 at the image transfer station. This is accomplished by a corona discharger 173. The toner image transferred to the transfer paper 172 is fixed by a suitable fixing device such as a heating-fixing device provided with a pair of rollers 174 and 175 urged against the transfer paper, and then conveyed into container means, not shown.

After completion of the image transfer, the surface of the photosensitive medium is cleaned by the edge of an elastic blade 176 urged there against to remove any residual toner, thus becoming ready for another cycle of the above-described image formation process. Although the discharger 167 is installed so as to discharge the surface of the photosensitive medium 161 simultaneously with the application of the light image, it may alternatively be disposed between the charger 162 and the image forming system so as to discharge the surface of the photosensitive medium 161 prior to the application of the light image. In this case, the lamp 168 is unnecessary. Also, the photosensitive medium 161 may be one having no insulating surface layer. In this case, the discharger 167 and the lamp 168 are unnecessary.

In the foregoing, each element lens system has been described as comprising two bar lenses, but since each element lens system is an erect positive image system, the projection device may of course be one which comprises a plurality of sets of coaxial bar lenses, in other words, comprises element lens systems coupled together in series.

As has hitherto been described, if use is made of the construction of the projection device according to the present invention and of the method of making the same, there may be provided a compact projection device which is highly excellent in accuracy and quality of projected image and is high in mass-producibility and low in cost and which is free of irregularity of exposure.

What we claim is:

1. A projection device having:
   two bar lenses each having a great length in the direction of the optic axis thereof as compared with the effective diameter thereof and controlling the distribution of intensity of light in a predetermined part area on an image plane corresponding to a part area of an object, by a lens aperture eclipse, said distribution of intensity of light being such that the intensity of light is weaker in the marginal area than at least in the central area;
   a light absorbing portion provided on the outer peripheral portion of said bar lenses for attenuating and eliminating unnecessary light rays which reach the other portion of said bar lenses than the effective diameter area thereof;
   one lens holding member for controlling the position of a plurality of element lens systems in the direction of the optic axis arranged substantially equidistantly in a predetermined direction in a plane perpendicular to the optic axis, by groove portions in the direction of the optic axis, such that distributions of intensity of light are superposed upon one another at least in said marginal area, each of said element lens systems comprising said light absorbing portion and said bar lenses; and the other lens holding member provided with substantially equidistant groove portions offset by a half pitch with respect to and opposed to said groove portions of said one lens holding member, said other lens holding member being for controlling the position of said element lens systems in the direction of the optc axis in said groove portions.

2. The projection device according to claim 1, wherein said bar lenses have a uniform diameter.

3. The projection device according to claim 1, wherein one end of each of said bar lenses has an outside diameter larger than the effective diameter thereof and the other portion in the end surface of each said bar lens than the effective diameter area thereof is a light non-transmitting portion.

4. The projection device according to claim 1, wherein said light absorbing portion has substantially the same refractive index as that of said bar lenses.

5. The projection device according to claim 1, wherein said element lens systems are coupled together by pipe members.

6. A projecting device having:

two bar lenses each having a great length in the direction of the optical axis thereof as compared with the effective diameter thereof and controlling the distribution of intensity of light in a predetermined part area on an image plane corresponding to a part area of an object by a lens aperture eclipse, said distribution of intensity of light being such that the intensity of light is uniform in the central area and weaker in the marginal area than in the central area; and a lens holding member for controlling the position of a plurality of element lens systems in the direction of the optical axis arranged substantially equidistantly in a predetermined direction in a plane perpendicular to the optical axis, by hole portions in the direction of the optical axis provided in a honeycomb-like fashion in two rows offset from each other by a half pitch in a predetermined direction, such that distributions of intensity of light are superposed upon one another at least in said marginal area.

7. The projection device according to claim 6, further having a light absorbing portion provided on the outer peripheral portion of said bar lenses for attenuating and eliminating unnecessary light rays which reach the other portion of said bar lenses than the effective diameter area thereof.

8. The projection device according to claim 6, wherein said bar lenses have a uniform diameter.

9. The projection device according to claim 6, wherein one end of each of said bar lenses has an outside diameter larger than the effective diameter thereof and the other portion in the end surface of each said bar lens than the effective diameter area thereof is a light non-transmitting portion.

10. The projection device according to claim 8, wherein said light absorbing portion has substantially the same refractive index as that of said bar lenses.

11. The projection device according to claim 6, wherein said element lens systems are coupled together by pipe members.

12. A projection device having:

two bar lenses each having a great length in the direction of the optic axis thereof as compared with the effective diameter thereof and controlling the distribution of intensity of light in a predetermined part area on an image plane corresponding to a part area of an object by a lens aperture eclipse, said distribution of intensity of light being such that the intensity of light is weaker in the marginal area than at least in the central area;

a pipe member for coupling element lens systems comprising said bar lenses in the direction of the optic axis; and a coupling member for causing a plurality of said pipe members to be arranged substantially equidistantly in a predetermined direction in a plane perpendicular to the optic axis and circumscribe each other such that the distributions of intensity of light of said element lens system are superposed upon one another at least in said marginal area.

13. The projection device according to claim 12, wherein said pipe members for coupling said element lens systems in the direction of the optic axis circumscribe each other in a honeycomb-like fashion in two rows offset from each other by a half pitch.

* * * * *

UNITED STATES PATENT OFFICE
CERTIFICATE OF CORRECTION

Patent No. 4,275,962     Dated June 30, 1981

Inventor(s) KOYO MIDORIKAWA, ET AL.

It is certified that error appears in the above-identified patent and that said Letters Patent are hereby corrected as shown below:

Column 4, line 21, change "1" to --$\ell$--.

Column 5, line 26, change "$1 + (\frac{1}{2Fe})^2$" to --$1 - (\frac{1}{2Fe})^2$--.

Column 4, line 50, "$\frac{1}{\{\phi_1 + \phi_2 - \phi_1 e_1'\phi_2\}S_1 + \{1-e_1'\phi_2\}}$" should be --$\frac{1}{\{\varphi_1 + \varphi_2 - \varphi_1 e_1'\varphi_2\}S_1 + \{1 - e_1'\varphi_2\}}$--.

line 53, "$\phi_1 \equiv n_1'-1/r_1$" should be --$\varphi_1 \equiv \frac{n_1'-1}{r_1}$-- line 54, "$\phi_2 \equiv 1-n_1'/r_2$" should be --$\varphi_2 \equiv \frac{1-n_1'}{r_2}$-- line 63, "$\phi$" should be --$\varphi$--;

line 65, "$\phi$" should be --$\varphi$--.

Column 5, line 7, "$\phi_1$" should be --$\varphi_1$--;

UNITED STATES PATENT OFFICE
CERTIFICATE OF CORRECTION

Patent No. 4,275,962         Dated June 30, 1981

Inventor(s) KOYO MIDORIKAWA, ET AL.

It is certified that error appears in the above-identified patent and that said Letters Patent are hereby corrected as shown below:

line 14, "$\phi$" should be --$\varphi$--;

line 49,

"$\dfrac{1}{\{\phi_3 + \phi_4 - \phi_3 e_2' \phi_4\}(-S_4') + 1 - e_2' \phi_3\}}$" should be --$\dfrac{1}{\{\varphi_3 + \varphi_4 - \varphi_3 e_2' \varphi_4\}(-S_4') + 1 - e_2' \varphi_3\}}$-- line 52, "$\phi_3 \equiv n_2' - 1/r_3$" should be

--$\varphi_3 \equiv \dfrac{n_2'-1}{r_3}$-- line 53, "$\phi_4 \equiv 1 - n_2'/r_4$" should be

--$\varphi_4 \equiv \dfrac{1-n_2'}{r_4}$--

Column 6, line 3, "$\phi$" should be --$\varphi$--;

line 5, "$\phi$" should be --$\varphi$--;

line 15, "$\phi_4 = \dfrac{1}{S_4}\{1+\phi_4/\phi_3\}$" should be

--$\varphi_4 = \dfrac{1}{S_4}\{1+\dfrac{\phi_4}{\phi_3}\}$--

UNITED STATES PATENT OFFICE
CERTIFICATE OF CORRECTION

Patent No. 4,275,962  Dated June 30, 1981

Inventor(s) KOYO MIDORIKAWA, ET AL.

It is certified that error appears in the above-identified patent and that said Letters Patent are hereby corrected as shown below:

line 22, "$\phi$" should be --$\varphi$--.

Column 8, line 38,

"$$\frac{1}{(\phi_1 + \phi_2 - \phi_1 e_1' \phi_2) S_1 + (1 - e_1' \phi_2)}$$" should be $$--\frac{1}{(\varphi_1 + \varphi_2 - \varphi_1 e_1' \varphi_2) S_1 + (1 - e_1' \varphi_2)}--$$

line 41, "$\phi_1 \equiv n_1' - 1/r_1$" should be $$--\varphi_1 \equiv \frac{n_1' - 1}{r_1}--$$

line 42, "$\phi_2 \equiv 1 - n_1'/r_2$" should be $$--\varphi_2 \equiv \frac{1 - n_1'}{r_2}--$$

line 51, "$\phi_2$" should be --$\varphi_2$--;

line 53, "$\phi_1$" should be --$\varphi_1$--;

UNITED STATES PATENT OFFICE
CERTIFICATE OF CORRECTION

Patent No. 4,275,962                    Dated  June 30, 1981

Inventor(s) KOYO MIDORIKAWA, ET AL.

It is certified that error appears in the above-identified patent and that said Letters Patent are hereby corrected as shown below:

line 67, "$\phi$" should be --$\varphi$--.

Column 9, line 30,

"$$\frac{1}{(\phi_3 + \phi_4 - \phi_3 e_2' \phi_4)(-S_4') + (1 - e_2' \phi_3)}$$" should be --$$\frac{1}{(\varphi_3 + \varphi_4 - \varphi_3 e_2' \varphi_4)(-S_4') + (1 - e_2' \varphi_3)}$$--;

line 33, "$\phi_3$" should be --$\varphi_3$--;

line 34, "$\phi_4$" should be --$\varphi_4$--;

line 43, "$\phi_3$" should be --$\varphi_3$--;

line 44, "$\phi_4$" should be --$\varphi_4$--;

line 58, "$\phi$" should be --$\varphi$--.

UNITED STATES PATENT OFFICE
CERTIFICATE OF CORRECTION

Patent No. 4,275,962   Dated June 30, 1981

Inventor(s) KOYO MIDORIKAWA, ET AL.

It is certified that error appears in the above-identified patent and that said Letters Patent are hereby corrected as shown below:

IN THE CLAIMS

Claim 1, last line, "optc" should be --optic--.

Signed and Sealed this

Sixth Day of July 1982

[SEAL]

Attest:

GERALD J. MOSSINGHOFF

Attesting Officer   Commissioner of Patents and Trademarks